United States Patent
Roll et al.

(10) Patent No.: US 8,483,925 B2
(45) Date of Patent: Jul. 9, 2013

(54) DEVICE FOR DETERMINING A DRIVING STATE AND METHOD FOR THE DRIVING-STATE-DEPENDENT OPERATION OF A COMBINED VEHICLE BRAKE SYSTEM

(75) Inventors: Georg Roll, Heusenstamm (DE); Jochen Leideck, Darmstadt (DE); Peter Cisarz, Hofheim (DE); Jens Jaeger, Wiesbanden-erbenheim (DE); Paul Linhoff, Neu-anspach (DE)

(73) Assignee: Continental Teves AG & Co. oHG (DE)

( * ) Notice: Subject to any disclaimer, the term of this patent is extended or adjusted under 35 U.S.C. 154(b) by 413 days.

(21) Appl. No.: 12/515,629

(22) PCT Filed: Nov. 28, 2007

(86) PCT No.: PCT/EP2007/062963
§ 371 (c)(1),
(2), (4) Date: May 20, 2009

(87) PCT Pub. No.: WO2008/065147
PCT Pub. Date: Jun. 5, 2008

(65) Prior Publication Data
US 2010/0030444 A1    Feb. 4, 2010

(30) Foreign Application Priority Data

Nov. 29, 2006 (DE) .................. 10 2006 056 594
Nov. 28, 2007 (DE) .................. 10 2007 057 605

(51) Int. Cl.
*B60T 7/12* (2006.01)
(52) U.S. Cl.
USPC .................. 701/83; 701/78; 701/80

(58) Field of Classification Search
USPC .................. 701/1, 70–73, 78, 83, 80
See application file for complete search history.

(56) References Cited

U.S. PATENT DOCUMENTS

| 5,318,355 | A |   | 6/1994  | Asanuma et al. |
|-----------|---|---|---------|----------------|
| 5,472,264 | A |   | 12/1995 | Klein et al.   |
| 5,694,321 | A |   | 12/1997 | Eckert et al.  |
| 5,833,328 | A | * | 11/1998 | Matsuda ............. 303/150 |
| 5,853,229 | A |   | 12/1998 | Willmann et al. |
| 5,934,770 | A | * | 8/1999  | Okazaki ............. 303/150 |
| 6,457,784 | B1 |  | 10/2002 | Böhm et al.    |
| 6,820,947 | B2 |  | 11/2004 | Atoche-Juarez et al. |

(Continued)

FOREIGN PATENT DOCUMENTS

| DE | 33 42 555 A1 | 6/1985 |
| DE | 41 24 496 A1 | 1/1993 |

(Continued)

*Primary Examiner* — Hussein A. Elchanti
(74) *Attorney, Agent, or Firm* — RatnerPrestia

(57) ABSTRACT

A device for determining a driving state of a two-axle motor vehicle, which driving state is formed from the driving situation of the motor vehicle and the state of the underlying surface, wherein output signals from vehicle on-board sensors are evaluated in order to determine the driving situation and wherein a routine for determining and/or estimating the friction value of the underlying surface is provided in order to determine the state of the underlying surface. Also disclosed is a method for operating a combined vehicle brake system, in particular for motor vehicles, having hydraulically actuable wheel brakes at a front axle and having electromechanically actuable wheel brakes at a rear axle, wherein the vehicle wheels assigned to the rear axle can be driven at least at times by an electric motor which can be operated as a generator for the recuperation of braking energy.

10 Claims, 3 Drawing Sheets

U.S. PATENT DOCUMENTS

| | | | | |
|---|---|---|---|---|
| 6,923,514 B1 * | 8/2005 | Spieker et al. | | 303/199 |
| 2004/0046448 A1 | 3/2004 | Brown | | |
| 2004/0162187 A1 * | 8/2004 | Suzuki | | 477/182 |
| 2004/0204812 A1 | 10/2004 | Tran | | |
| 2004/0238244 A1 * | 12/2004 | Amanuma et al. | | 180/65.2 |
| 2005/0103551 A1 * | 5/2005 | Matsuno | | 180/243 |
| 2007/0107958 A1 * | 5/2007 | Oliver | | 180/65.4 |
| 2007/0112475 A1 * | 5/2007 | Koebler et al. | | 701/1 |

FOREIGN PATENT DOCUMENTS

| | | |
|---|---|---|
| DE | 195 15 048 A1 | 5/1996 |
| DE | 196 04 134 A1 | 8/1997 |
| DE | 198 59 964 C2 | 9/2000 |
| DE | 101 63 678 A1 | 7/2003 |
| EP | 0 594 860 A1 | 5/1994 |
| WO | WO 99/46139 | 9/1999 |

* cited by examiner

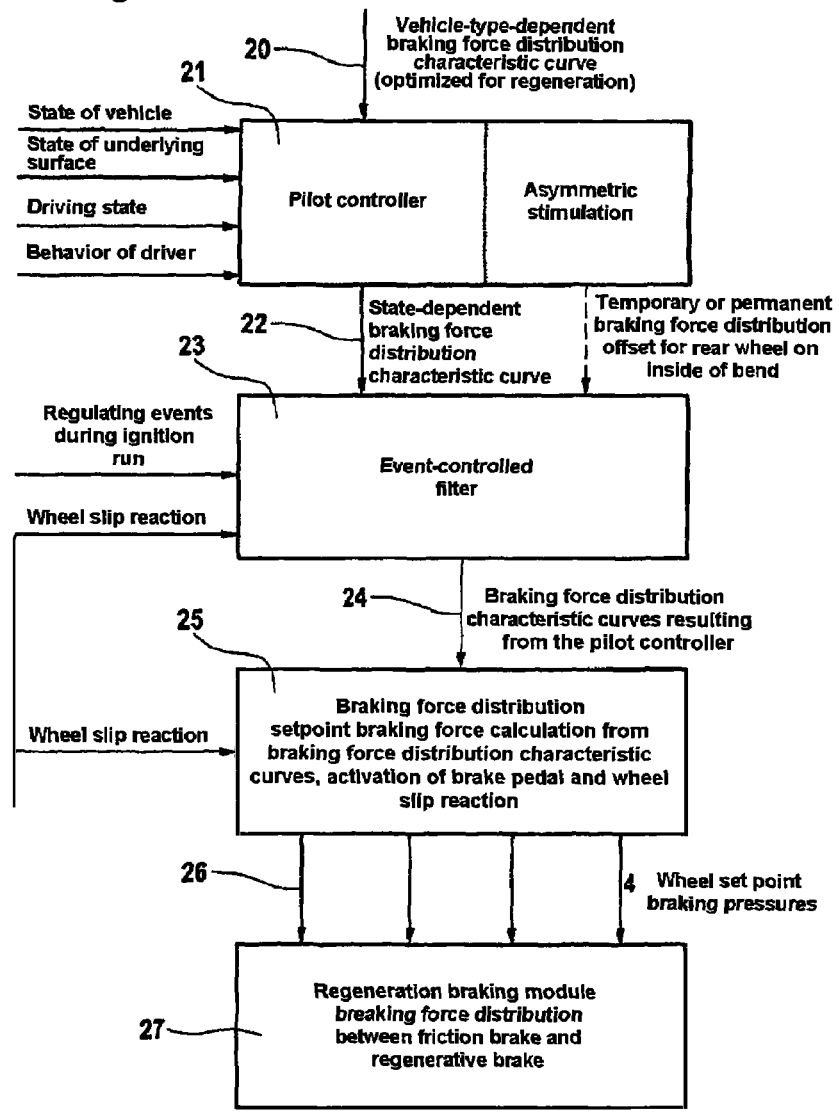

DEVICE FOR DETERMINING A DRIVING STATE AND METHOD FOR THE DRIVING-STATE-DEPENDENT OPERATION OF A COMBINED VEHICLE BRAKE SYSTEM

CROSS REFERENCE TO RELATED APPLICATIONS

This application is the U.S. national phase application of PCT International Application No. PCT/EP2007/062963, filed Nov. 28, 2007, which claims priority to German Patent Application No. DE102006056594.0, filed Nov. 29, 2006 and German Patent Application No. DE102007057605.8, filed Nov. 28, 2007, the contents of such applications being incorporated by reference herein.

BACKGROUND OF THE INVENTION

1. Field of the Invention

The invention relates to a device for detecting a driving state of a two-axle motor vehicle.

2. Description of the Related Art

The invention relates to a device for detecting a driving state of a two-axle motor vehicle, which driving state is formed from the driving situation of the motor vehicle and the state of the underlying surface, wherein output signals from vehicle on-board sensors are evaluated in order to determine the driving situation, and wherein a routine for detecting and/or estimating the coefficient of friction of the underlying surface is provided in order to determine the state of the underlying surface. Furthermore, the invention relates to a method for operating a combined vehicle brake system, in particular for motor vehicles, having hydraulically activated wheel brakes on a front axle and having electromechanically activated wheel brakes on a rear axle, wherein the vehicle wheels which are assigned to the rear axle are driven at least temporarily by an electric motor which can be operated as a generator in order to recover braking energy, and in the generator mode brings about a braking force at the vehicle wheels which are assigned to the rear axle, and wherein a pedal travel sensor detects the driver's braking request and feeds it to an open-loop and closed-loop control unit which distributes the braking force for the hydraulically activated wheel brakes, the electric mechanically activated wheel brakes and the electric motor which can be operated in the generator mode.

The purpose of such brake systems in motor vehicles is to store, as a supplement to a suitable drive, at least some of the energy in the vehicle which is recovered during braking and to re-use it to drive the vehicle. As a result, the energy requirement of the vehicle overall can be lowered, the efficiency increased and the operation therefore made more economical.

In the combined brake system which is mentioned at the beginning, a pair of hydraulic friction brakes are provided for braking the front axle wheels and a pair of electromechanically activated friction brakes are provided for braking the rear axle wheels, as are known from conventional motor vehicles, and an electric motor is used which can also be operated as a generator. At least some of the total braking force is applied by means of the generator or the electric motor which is in the generator mode. The acquired electrical energy is fed or fed back into a storage medium such as, for example, an on-board battery and is re-used to drive the motor vehicle by means of a suitable drive unit.

In order to brake such a motor vehicle which has an electric motor as a sole or additional drive which can be used to recover braking energy in the generator mode, a further braking torque is applied by the electric motor in addition to the braking torque of the hydraulically and electromechanically activated wheel brakes, which braking torque is applied by the brake system which is activated by the driver. This braking torque of the electric motor arises from the known effect in electric motors which act as a dynamo or a generator and generate electric current when they are being driven mechanically without electric current being supplied. In this context, an opposing force is produced which counteracts the mechanical drive and acts as a braking torque in the present case. The electric motor which is operated as a generator therefore acts as a brake. The total braking force of the motor vehicle which can be applied directly by the driver is therefore composed of the braking force of the hydraulically activated wheel brakes, the braking force of the electromechanically activated wheel brakes and the braking force of the electric motor which acts as a generator.

WO 99/46139 discloses a method and a device for statically or dynamically detecting setpoint values for braking forces, in which case depending on the deceleration request either the setpoint value for the electrically regenerative brake is made as large as possible or the setpoint values for the electrically regenerative brake and for the friction brake are set primarily in accordance with criteria relating to the distribution of braking force at the axles. In this context, the setpoint value for the electrically regenerative brake can be predefined in accordance with the rotational speed of the electric motor or in accordance with the charged state of the battery. In contrast, distribution of braking force as a function of the driving state is not provided.

In addition, from the theory of movement dynamics it is known that a vehicle with an overbraked rear axle has a tendency to experience movement dynamics instability.

SUMMARY OF THE INVENTION

An object of the present invention is therefore to present a device and a method which detects the driving state of the motor vehicle and adapts it to the distribution of the braking force in such a way that it is possible to improve the energy recovery potential while at the same time ensuring the stability of the vehicle.

This object is achieved according to aspects of the invention by virtue of the fact that the device for detecting a driving state outputs a numerical value which is a measure of the distribution of the braking force between the front axle and the rear axle of the motor vehicle.

In order to concretize the method according to aspects of the invention, there is provision that the numerical value is between 0 and 100 and it predefines the percentage portion of a provided maximum value of the braking force at the rear axle.

The determination of the driving situation is carried out using vehicle on-board sensors and using external information. In this context there is provision for the vehicle on-board sensors to sense the steering angle of a vehicle steering system, the lateral acceleration and/or the yaw rate of the motor vehicle, the velocity of the vehicle, the pedal travel of a brake pedal and/or of an accelerator pedal, the drive torque of a drive engine and the external environmental conditions such as external temperature and precipitation. Furthermore, further sensors are provided for sensing the surroundings. The external information is made available by a navigation system, a weather and environmental data transmission service and/or by communication with other motor vehicles.

The present object is achieved according to the method in that the driving state of the motor vehicle is detected and a numerical value which is a measure of the distribution of the braking force between the front axle and the rear axle of the motor vehicle is determined.

In one particularly advantageous development of the method according to aspects of the invention there is provision that the numerical value is between 0 and 100 and it predefines the percentage portion of the braking force at the rear axle, wherein the portion of the braking force at the vehicle wheels of the rear axle in the region of low decelerations is generated exclusively or virtually exclusively by the electric motor which is in the generator mode. In contrast, for reasons of stability of the vehicle, braking should not be carried out exclusively or virtually exclusively at the vehicle wheels of the rear axle when medium or relatively high decelerations occur, but instead a maximum value is selected for the portion of braking force at the vehicle wheels of the rear axle in order to recover braking energy while taking into account the driving stability.

In a further advantageous development of the method according to aspects of the invention there is provision that, in order to stabilize the motor vehicle in critical driving situations, the braking force at the vehicle wheels of the rear axle is distributed asymmetrically. There is provision here that the vehicle wheel on the outside of a bend on the rear axle is braked to a greater extent than the vehicle wheel on the inside of the bend on the rear axle in order to stabilize the motor vehicle when it travels through a bend.

BRIEF DESCRIPTION OF THE DRAWINGS

The invention is best understood from the following detailed description when read in connection with the accompanying drawing. Included in the drawing are the following figures:

FIG. 3 shows a flow chart of the detection of the driving state.

DETAILED DESCRIPTION OF THE PREFERRED EMBODIMENTS

Figure 1:
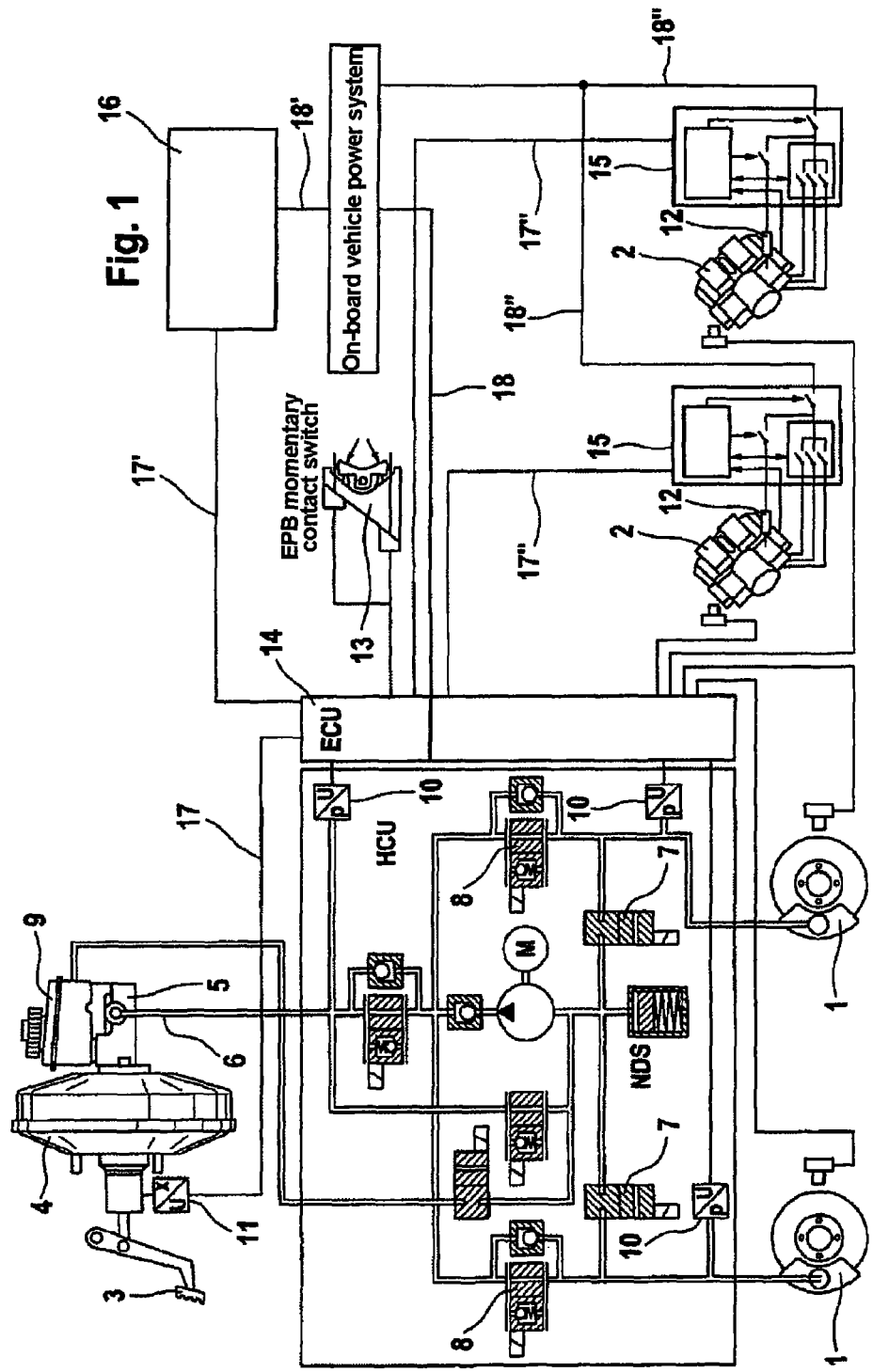
FIG. 1 is a schematically illustrated circuit diagram of a combined vehicle brake system having hydraulically activated wheel brakes on the front axle, electromechanically activated wheel brakes on the rear axle and an electric motor for regenerative braking processes.

A circuit diagram of the vehicle brake system on which the method according to aspects of the invention can be carried out is illustrated in FIG. 1. The vehicle brake system has, on the one hand, hydraulically activated wheel brakes 1 and, on the other hand, electromechanically activated wheel brakes 2. The hydraulically activated wheel brakes 1 are arranged on a first axle of the motor vehicle, the front axle, and they have hydraulic pressure medium applied to them using a pedal-activated vacuum brake booster 4 with master brake cylinder 5 connected downstream. For this purpose, the hydraulically activated wheel brakes 1 are connected to the master brake cylinder 5 via a hydraulic line 6 with the intermediate connection of inlet valves 8. When pressure is reduced, the applied pressure medium is let out into an unpressurized pressure medium reservoir vessel 9 via outlet valves 7. In order to detect the applied hydraulic pressure and to carry out regulating processes such as anti-lock regulating processes, a plurality of pressure sensors 10 are provided whose output signals are fed to a central open-loop and closed-loop control unit 14.

As is also apparent from FIG. 1, electromechanically activated wheel brakes 2, which can be activated as a function of the hydraulic pressure applied to the hydraulically activated wheel brakes 1, are arranged on a second axle, the rear axle of the motor vehicle. As already mentioned, the pressure which is applied to the hydraulically activated wheel brakes 1 is detected using the pressure sensors 10. The electromechanically activated wheel brakes 2 on the rear axle are actuated on the basis of this pressure value, i.e. a brake application force of the electromechanically activated wheel brakes 2 is set taking into account a distribution of the braking force function between the front axle and the rear axle. Furthermore, the electromechanically activated wheel brakes 2 can be actuated as a function of the activation travel of the brake pedal 3, that is to say in accordance with the request by the driver of the vehicle. For this purpose, the activation travel of the brake pedal 3 is detected using a pedal travel sensor 11. The actuation of the electromechanically activated wheel brakes 2 is performed in a decentralized fashion by means of two electronic control units 15 which are each assigned to an electromechanically activated wheel brake 2. The supply of electrical energy is implemented by means of a supply line 18" which connects the electromechanically activated wheel brakes 2 to the on-board vehicle power system.

As indicated schematically in FIG. 1, the electromechanically activated wheel brakes 2 have a parking brake device 12 with which the wheel brakes can be locked in the applied state in order to implement parking braking. The parking brake device 12 can be actuated using an operator control 13. The operator control 13 is embodied as a momentary contact switch and has three switched positions for the instructions "apply", "neutral" and "release", in which case only the central neutral position constitutes a stable switched position.

The driver's braking request is, as already mentioned, also sensed by the pedal travel sensor 11 and fed to the electronic open-loop and closed-loop control unit 14 via a signal line 17. Furthermore, the signals of the operator control 13 of the parking brake are fed to the open-loop and closed-loop control unit 14. The two decentralized electronic control units 15 of the electromechanically activated wheel brakes 2 are also connected to the open-loop and closed-loop control unit 14 via a signal line 17".

An electric motor 16, which acts, on the one hand, as a sole drive in an electric car or as an additional drive in a vehicle with an internal combustion engine and, on the other hand, is used to recover braking energy in the generator mode is connected to the open-loop and closed-loop control unit 14 via a further signal line 17'. The electric motor 16 draws its supply voltage in the case of driving via a supply line 18' from the on-board vehicle power system and in the generator mode it feeds the electrical energy back into the on-board vehicle power system via the same supply line 18'. In the generator mode just mentioned, the electric motor 16 acts as a dynamo and generates an electric current via a voltage which is generated. In the process, an opposing force which acts as a further braking torque is produced. The electric motor 16 which is operated as a generator therefore acts as a brake. The total braking force of the motor vehicle is therefore composed of the braking force of the hydraulically activated wheel brakes 1, the braking force of the electromechanically activated wheel brakes 2 and the braking force of the electric motor 16 which acts as a generator. These three possible braking forces have to be adapted in a suitable way, and this is made possible by suitable distribution of the braking force.

Figure 2:
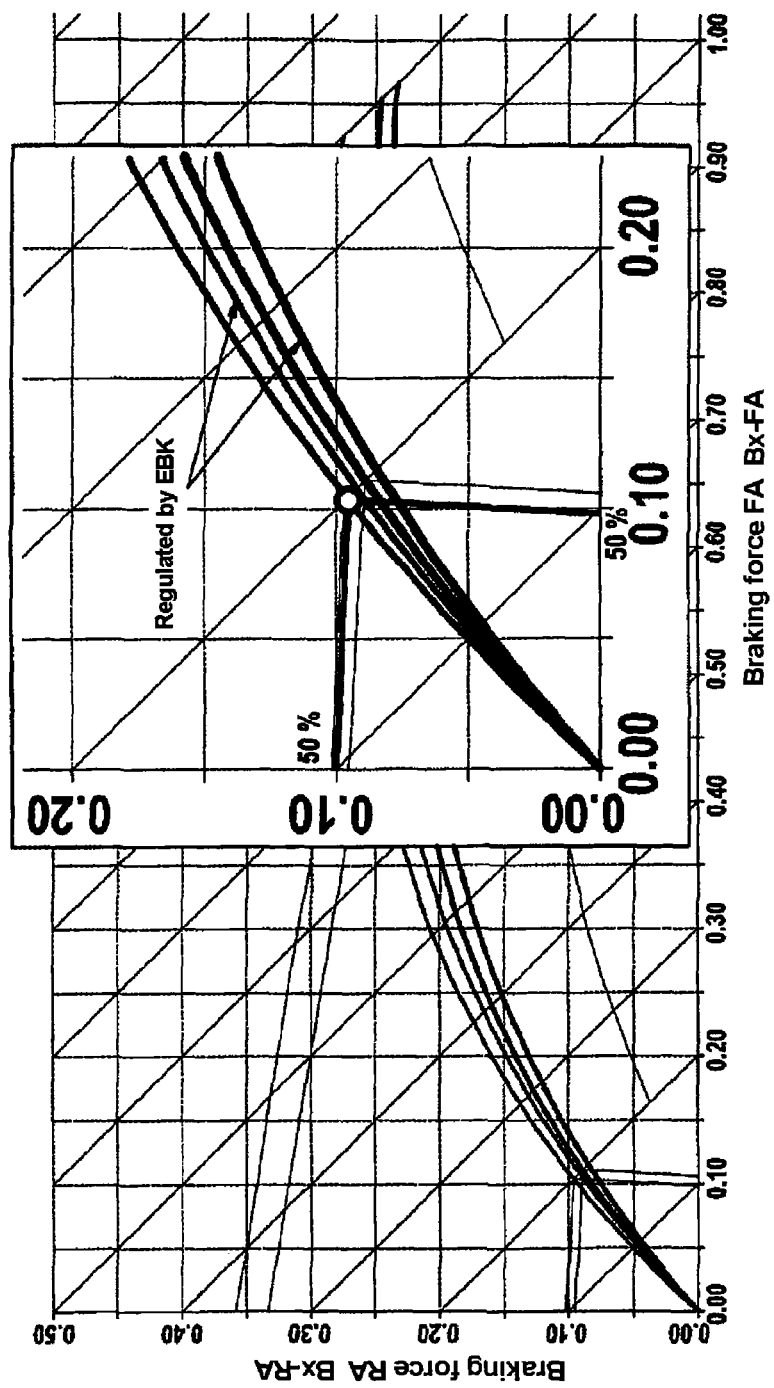
FIG. 2 shows the distribution of the braking force according to the inventive method with regenerative braking.

In the distribution of the braking force illustrated in FIG. 2, the braking force at the rear axle (also referred to for short as RA) is plotted on the ordinate, and the braking force at the front axle (also referred to for short as FA) is plotted on the abscissa. FIG. 2 illustrates a distribution of the braking force such as is provided in a combined vehicle brake system which is described on the basis of FIG. 1 and has hydraulically activated wheel brakes 1 on the front axle and electromechanically activated wheel brakes 2 on the rear axle. The distribution of the braking force provides what is referred to as 50/50 division, i.e. 50% of the braking force for the entire vehicle is applied by the hydraulically activated wheel brakes 1 of the front axle, and 50% of the total braking force is applied by the electromechanical wheel brakes 2 of the rear axle. In the recovery mode, the electromechanically activated wheel brakes 2 do not, however, make available any braking force but rather the braking force is generated by the electric motor 16 which is operated as a generator. Therefore, the potential for the recovery of braking energy in the region of low braking forces in the case of the abovementioned distribution of the braking force of the static vehicle weight of 50%/50% is correspondingly 50% of the braking energy.

Generally, efforts are made to increase the potential for the recovery of braking energy on the basis of the distribution of the braking force described in FIG. 3. For this purpose, the distribution of the braking force is changed in the region of low vehicle decelerations in such a way that the portion of braking force at the vehicle wheels of the rear axle is greater than the portion of braking force at the vehicle wheels of the front axle. Since, as already described, the braking force at the vehicle wheels of the rear axle is generated exclusively by means of the generator in the recovery mode, that is to say since the portion of braking force at the vehicle wheels of the rear axle is generated exclusively or virtually exclusively by the electric motor 16 in the generator mode when the battery is not completely charged, the recovered braking energy increases significantly. For the lower deceleration range it is considered possible and acceptable to increase greatly the portion of braking force at the rear axle in relation to the front axle. However, in order to prevent unstable states occurring in such a context, the present method provides for the braking force to be distributed as a function of the detected driving state of the motor vehicle, that is to say for the distribution of the braking force to be adapted to the driving state of the motor vehicle.

For this purpose, a device for detecting a driving state is provided. The driving state is composed of the driving situation of the motor vehicle and the state of the underlying surface. Output signals from vehicle on-board sensors are evaluated in order to determine the driving situation, and a routine for detecting or estimating the coefficient of friction $\mu$ of the underlying surface is provided in order to determine the state of the underlying surface. This device for detecting a driving state outputs a numerical value which is a measure of the distribution of the braking force between the front axle and the rear axle of the motor vehicle. This numerical value specifies the percentage portion of the braking force at the rear axle which is implemented in accordance with a permanently set braking force distribution, that is to say if the numerical value is 100, 100% of the braking force which is to be set for the entire vehicle in accordance with the static braking force distribution is taken up by the brake devices at the rear axle, that is to say by the electric motor operated in the generator mode, and if appropriate by the electromechanically activated wheel brakes 2.

In order to determine the driving situation of the motor vehicle, the steering angle, the lateral acceleration and the yaw rate are detected in order to detect cornering of the motor vehicle. The detection of the driving situation also takes into account the velocity of the vehicle and the decisive environmental conditions such as external temperature, precipitation, wind, fog and dew. This can also be done by detecting the surroundings and by image recognition or by evaluating the measurement of the air mass.

In addition to the driving situation, the state of the underlying surface is a component of the driving state. The properties of the underlying surface are detected by an independent regulating process or other information from vehicle sensors. Information from warning services and weather services is also taken into account in the detection of the state of the underlying surface. Furthermore, specific local conditions such as freeway bridges, forest aisles, tight bends or particular driving situations such as black ice are detected by internal and external position sensors and map data, or by communication with other motor vehicles.

Furthermore, a driver profile can be created and included in the detection of the driving state. The same applies to the detection of a situation with roads in a poor state using means outside the vehicle or vehicle on-board means. The gradient in the transverse and longitudinal directions is evaluated just like the measured axle loads in order to detect the driving state. The tire pressure, a tire character detection for detecting summer tires, winter tires and all-year tires, and detection of emergency wheels add further information for the detection of the driving state.

All the abovementioned information is, insofar as it is available, used to detect the driving state of the motor vehicle, and a numerical value is determined which is a measure of the distribution of the braking force between the front axle and the rear axle of the motor vehicle, with the result that what is referred to as overbraking of the rear axle and the generation of unsafe driving states are prevented and at the same time the maximum possible potential for the recovery of energy during regenerative braking is utilized. In this context, for example in order to stabilize the motor vehicle in critical driving situations, there is provision for the braking force at the vehicle wheels of the rear axle to be distributed asymmetrically. The target asymmetry of the utilization of the coefficient of friction at the rear wheels causes the vehicle wheel on the outside of a bend on the rear axle to be braked to a greater extent than the vehicle wheel on the inside of the bend on the rear axle as a function of vehicle parameters, driving state parameters and underlying surface state parameters, and stabilizes the motor vehicle when it travels through a bend.

The sequence of the detection of the driving state and the changed distribution of the braking force from it are illustrated in FIG. 3: at first, the detection of the vehicle-type-dependent braking force distribution characteristic curve is called up in method step 20. In the pilot controller 21, the driving state and the state of the underlying surface are taken into account, as has already been explained above. Furthermore, the state of the vehicle and the driver's behavior are processed in the pilot controller. A state-dependent characteristic curve for the distribution of the braking force is output as a result in method step 22. This characteristic curve for the distribution of the braking force is checked in a filter 23 for its compatibility with the regulating events during an ignition run and with the wheel slip reactions. After this checking, the resulting characteristic curve in method step 24 is sent to the braking force distribution module 25, which calculates the setpoint braking force from the resulting characteristic curve for the distribution of the braking force, and predefines a total of four setpoint braking forces for the four vehicle wheels (method step 26). The module 27 is, as a regeneration braking module, responsible for the distribution of the braking force between the friction brake and the regenerative brake, and it performs the distribution in accordance with the prescription that the potential for the recovery of energy is fully utilized.

While preferred embodiments of the invention have been described herein, it will be understood that such embodiments are provided by way of example only. Numerous variations, changes and substitutions will occur to those skilled in the art without departing from the spirit of the invention. It is intended that the appended claims cover all such variations as fall within the spirit and scope of the invention.

The invention claimed is:

1. A device for detecting a driving state of a two-axle motor vehicle including an electrical regenerative brake and an electromechanical friction brake on a first axle and a mechanical brake on a second axle, the device including:
a processor configured to:
determine the driving state based on a driving situation of the motor vehicle and a state of the underlying road surface that is determined based on an estimated coefficient of friction (μ) of the underlying road surface, and
control an amount of electrical energy generated by the electrical regenerative brake during braking of the vehicle by controlling a distribution of brake force between the electrical regenerative brake, the electromechanical friction brake and the mechanical brake based on the driving state of the vehicle,
wherein the amount of electrical energy is increased by increasing braking force applied to the first axle and decreasing braking force to the second axle, and
wherein the braking force is distributed asymmetrically between a left vehicle wheel on the first axle and a right vehicle wheel on the first axle based on the driving state of the vehicle.

2. The device as claimed in claim 1, wherein a numerical value between 0 and 100 represents the percentage portion of a provided maximum value of the braking force on the first axle.

3. The device as claimed in claim 1, wherein the driving state is determined by using vehicle on-board sensors and using external information.

4. The device as claimed in claim 3, wherein the vehicle on-board sensors sense a steering angle of a vehicle steering system, a lateral acceleration, a yaw rate of the motor vehicle, a velocity of the vehicle, a pedal travel of a brake pedal, a pedal travel of an accelerator pedal, a drive torque of a drive engine, external environmental conditions, or any combination thereof.

5. The device as claimed in claim 4, wherein the external environmental conditions include external temperature or precipitation.

6. The device as claimed in claim 4, wherein further sensors are provided for sensing the surroundings, having at least one element from a group radar, lidar, optical camera or infrared.

7. The device as claimed in claim 3, wherein the external information is made available by a navigation system, a weather and environmental data transmission service, communication with other motor vehicles, or any combination thereof.

8. A method for operating a combined vehicle brake system of a motor vehicle having a hydraulic wheel brake on a front axle, and having an electrical regenerative wheel brake and an electromechanical friction wheel brake on a rear axle, the method comprising:
determining, by a processor, a driving state based on a driving situation of the motor vehicle, and
controlling, by the processor, an amount of electrical energy generated by the electrical regenerative wheel brake during braking of the vehicle by controlling a distribution of brake force between the electrical regenerative wheel brake, the electromechanical friction wheel brake and the hydraulic wheel brake based on the driving state of the vehicle,
wherein the amount of electrical energy is increased by increasing braking force applied to the rear axle and decreasing braking force to the front axle, and
wherein the braking force is distributed asymmetrically between a left vehicle wheel on the rear axle and a right vehicle wheel on the rear axle based on the driving state of the vehicle.

9. The method as claimed in claim 8, wherein a numerical value between 0 and 100 represents a percentage portion of the braking force at the rear axle, wherein the portion of the braking force at the vehicle wheels of the rear axle in the region of low decelerations is generated exclusively or virtually exclusively by the electric motor which is operating in the generator mode.

10. A device for detecting a driving state of a two-axle motor vehicle including an electrical regenerative brake and an electromechanical friction brake on a first axle and a mechanical brake on a second axle, the device including:
a processor configured to:
determine the driving state based on a driving situation of the motor vehicle and a state of the underlying road surface that is determined based on an estimated coefficient of friction (μ) of the underlying road surface, and
control an amount of electrical enemy generated by the electrical regenerative brake during braking of the vehicle by controlling a distribution of brake force between the electrical regenerative brake, the electromechanical friction brake and the mechanical brake based on the driving state of the vehicle,
wherein the amount of electrical energy is increased by increasing braking force applied to the first axle and decreasing braking force to the second axle,
wherein the braking force is distributed asymmetrically between a left vehicle wheel and a right vehicle wheel on the first axle based on the driving state of the vehicle, and
wherein when the motor vehicle travels through a bend, a vehicle wheel on the outside of a bend on the rear axle is braked to a greater extent than the vehicle wheel on the inside of the bend on the rear axle in order to stabilize the motor vehicle when it travels through the bend.

\* \* \* \* \*